United States Patent
Lebeau et al.

(10) Patent No.: US 11,439,069 B2
(45) Date of Patent: Sep. 13, 2022

(54) BALE WRAPPING DEVICE FOR A ROUND BALER, ROUND BALER AND METHOD FOR OPERATING A ROUND BALER

(71) Applicant: DEERE & COMPANY, Moline, IL (US)

(72) Inventors: Jonathan Lebeau, Dijon (FR); Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 373 days.

(21) Appl. No.: 16/841,005

(22) Filed: Apr. 6, 2020

(65) Prior Publication Data

US 2020/0323146 A1     Oct. 15, 2020

(30) Foreign Application Priority Data

Apr. 12, 2019    (DE) .......................... 102019205330.0

(51) Int. Cl.
| | | |
|---|---|---|
| *A01F 15/07* | (2006.01) | |
| *B65B 27/12* | (2006.01) | |
| *F16D 63/00* | (2006.01) | |
| *F16D 121/14* | (2012.01) | |
| *F16D 125/64* | (2012.01) | |

(52) U.S. Cl.
CPC ........ *A01F 15/0715* (2013.01); *B65B 27/125* (2013.01); *F16D 63/006* (2013.01); *A01F 2015/072* (2013.01); *F16D 2121/14* (2013.01); *F16D 2125/64* (2013.01)

(58) Field of Classification Search
CPC ...... A01F 15/07; A01F 15/0715; A01F 15/12; A01F 15/14

USPC ................................................... 53/116–118
See application file for complete search history.

(56) References Cited

U.S. PATENT DOCUMENTS

| | | | | |
|---|---|---|---|---|
| 7,918,069 | B2 * | 4/2011 | Viaud ................. | A01F 15/0715 53/118 |
| 8,516,779 | B2 * | 8/2013 | Bennett .............. | A01F 15/0715 53/118 |
| 9,677,633 | B2 * | 6/2017 | Horner ................... | F16D 49/10 |
| 9,980,436 | B2 * | 5/2018 | Vandamme ......... | A01F 15/0715 |
| 10,537,066 | B1 * | 1/2020 | Pramod .............. | A01F 15/0705 |
| 10,721,870 | B2 * | 7/2020 | Chapon .................. | A01F 15/12 |

FOREIGN PATENT DOCUMENTS

| | | |
|---|---|---|
| DE | 202016000568 U1 | 5/2017 |
| EP | 2835046 A1 | 2/2015 |
| EP | 3300586 A1 | 4/2018 |

OTHER PUBLICATIONS

European Search Report issued in counterpart application No. 20168459.4 dated Sep. 30, 2020 (07 pages).

\* cited by examiner

*Primary Examiner* — Christopher P Schwartz

(57) ABSTRACT

A bale wrapping device for a round baler includes a wrapping material roller having a wrapping material. The wrapping material roller is able to be brought into engagement with a brake roller, and a cutting apparatus for cutting off the wrapping material from the wrapping material roller. A brake apparatus cooperates with the brake roller, and is actuatable by the cutting apparatus such that a rotational movement of the brake roller is able to be braked by the brake apparatus.

9 Claims, 3 Drawing Sheets

BALE WRAPPING DEVICE FOR A ROUND BALER, ROUND BALER AND METHOD FOR OPERATING A ROUND BALER

CROSS-REFERENCE TO RELATED APPLICATIONS

This application claims priority to and the benefit of German Patent Application No. 102019205330.0, filed on Apr. 12, 2019, the disclosure of which is hereby incorporated by reference.

TECHNICAL FIELD

The disclosure generally relates to a round baler, and more specifically to a bale wrapping device of the round baler.

BACKGROUND

Round balers are known. It is also known to provide round balers with a bale wrapping device, whereby a pressed bale is wrapped with a wrapping material and may be subsequently ejected in wrapped form. The bale is shaped in a pressing chamber, in particular a cylindrical pressing chamber, of the round baler during a bale forming phase. To this end, harvested crops lying on the ground are conveyed by a harvested crop pick-up apparatus into the pressing chamber. A cylindrical bale, also called a round bale, is formed by the pressing means arranged therein. The pressing chamber may be configured as a fixed pressing chamber with cylindrically arranged pressing rollers or even as a variable pressing chamber with variable pressing means, for example pressing belts or pressing chains.

In an introduction phase following the bale forming phase, a wrapping material is guided into the pressing chamber from a wrapping material roller, in the direction of the round bale which has been formed in the meantime, and entrained from the outside of the bale. Generally netting, film or twine is used as the wrapping material. In a wrapping phase, the wrapping material is guided around the bale by the rotating bale. A cutting phase follows, in which the wrapping material is cut from the bale by a cutting apparatus before the bale is ejected in the bale ejection phase and/or deposited onto the ground.

It has proved to be a drawback to adapt the speed of the wrapping material roller to the individual phases, in particular to permit at the same time a specific braking force to act on the wrapping material roller, such that an optimal tightening and/or load relief and/or tensioning of the wrapping material is present, in particular for the cutting phase. As a result, it may lead to the wrapping material becoming entangled with the pressing means or even to the wrapping material being incorrectly cut, which in some circumstances would disrupt or even interrupt the bale pressing process. Moreover, if an inappropriate braking force acts on the wrapping material roller, the wrapping material may become damaged, which should be avoided.

SUMMARY

According to the disclosure a bale wrapping device for a round baler is proposed, preferably for encasing a round bale with a wrapping material. The bale wrapping device includes a wrapping material roller having the wrapping material and a brake roller. The wrapping material roller is able to be brought into engagement with the brake roller. Moreover, the bale wrapping device includes a cutting apparatus for cutting off the wrapping material from the wrapping material roller. Moreover, a brake apparatus, which cooperates with the brake roller, is provided. The brake apparatus is actuatable by means of the cutting apparatus such that a rotational movement of the brake roller is able to be braked by the brake apparatus, and, in particular, a rotational movement of the wrapping material roller in engagement with the brake roller is able to be braked by the brake roller.

The wrapping material may be configured as a film, in particular a plastic film or a film consisting of plastics or a film comprising plastics or a film coated with plastics. The wrapping material may also be a multi-layered composite film consisting of a combination of different plastics. The mechanical load-bearing capacity may have been further increased by reinforcing with glass fibres or introducing a mesh.

The brake roller may be in engagement with the wrapping material roller and/or may be in a frictional connection therewith. A brake torque acting on the brake roller may be introduced in a variable manner via the brake apparatus. The actuation of the brake apparatus in this case may be coupled to an actuation of the cutting apparatus, in particular synchronized therewith. This results in different brake torques and/or speeds and/or rotational speeds, in particular at least two different brake torques for a wrapping material roller in engagement with the brake roller. Different states of the tightening and/or load relief and/or tensioning of the wrapping material may be achieved when unrolling the wrapping material from the wrapping material roller. In particular, when the brake roller is in engagement with the wrapping material roller, a brake torque may be produced such that a rotational movement and/or a rotation of the wrapping material roller is braked, preferably stopped and/or blocked.

The round baler, in particular the bale wrapping device, may additionally include a further wrapping material roller having a twine or a different type of film or a netting as further wrapping material. The different type of film may, in particular, be a plastic film or a film consisting of plastics or a film comprising plastics or a film coated with plastics and/or a multi-layered composite film consisting of a combination of different plastics. The mechanical load-bearing capacity may have been increased by reinforcing with glass fibres or introducing a mesh. The wrapping material roller may be arranged in a first compartment and the further wrapping material roller may be arranged in a second compartment of the round baler, in particular the bale wrapping device. The first and second compartments may be spaced apart from one another or adjacent to one another. It is possible that the wrapping material and the further wrapping material are able to be supplied simultaneously to the pressing chamber but preferably either the wrapping material or the further wrapping material is able to be supplied to the pressing chamber. The cutting apparatus may comprise a blade arrangement. The blade arrangement may, for example, be a blade, in particular a sharp edge, which in turn is able to cut, i.e. to sever or to tear, the wrapping material from the wrapping material roller and/or the further wrapping material from the further wrapping material roller or the blade may interact with a counter-blade in order to produce a scissor action.

By means of the brake apparatus, a coupling of the cutting apparatus, preferably a coupling of a movement of the cutting apparatus, which particularly preferably also includes a movement of a blade arrangement or an actuator of the cutting apparatus, is produced with the rotational movement of the brake roller and/or the wrapping material roller. To this end, the cutting apparatus may be connected to the brake apparatus and/or the cutting apparatus and the brake apparatus may be fastened to one another. By the actuation of the brake apparatus by means of the cutting apparatus, an interaction, in particular a braking action, may be produced between the brake roller and the brake apparatus. At the same time, the rotational movement of the wrapping material roller may be braked, in particular stopped and/or blocked. The actuation of the brake apparatus by means of the cutting apparatus may be understood to mean in this case that the cutting apparatus exerts a force on the brake apparatus so that the brake apparatus is pivoted and/or moved in a translatory manner. In particular, the brake apparatus may be pivotably mounted about a pivot point of the brake apparatus, such that with an actuation of the brake apparatus by the cutting apparatus, the brake apparatus is pivoted such that a braking, in particular stopping and/or blocking, of the rotational movement of the brake roller is effected by the brake apparatus, whereby the rotational movement of the wrapping material roller in engagement with the brake roller is also braked, in particular also stopped and/or blocked, by the brake roller. In particular, the brake apparatus may be moved and/or pivoted by means of the cutting apparatus between an active braking position in which a rotational movement of the brake roller is able to be braked by the brake apparatus, in particular a rotational movement of the wrapping material roller in engagement with the brake roller is also able to be braked, and an inactive braked position in which the brake roller is freely rotatable and/or free-running, in particular is not in engagement with the brake apparatus. Thus a coupling, in particular a synchronization, of the cutting apparatus to the and/or with the rotational movement of the brake roller and/or wrapping material roller may be produced by means of the brake apparatus, such that the rotational movement of the wrapping material roller is stopped at the same time as a movement of the cutting apparatus, in particular the blade arrangement and/or the severing of the wrapping material. In other words, the rotational movement of the brake roller and/or the wrapping material roller may be synchronized with the cutting apparatus, in particular a movement of the cutting apparatus, by means of the brake apparatus. Advantageously, due to the synchronization of the rotational movement of the brake roller and/or the wrapping material roller with the cutting apparatus, problems with the unwrapping of the wrapping material may be avoided. Advantageously, therefore, a load relief and/or tightening and/or tensioning of the wrapping material may be achieved, in particular according to the synchronization of the actuation of the brake apparatus with the actuation of the cutting apparatus. Therefore, damage and/or tearing of the wrapping material may also be advantageously avoided. Similarly, for example, the extent of the braking of the wrapping material roller may be set by the brake roller.

In an aspect of the disclosure, the cutting apparatus is movable between at least an active cutting position and an inactive cutting position. The brake apparatus is thus actuatable, in particular pivotable, by means of the cutting apparatus such that a rotational movement of the brake roller is able to be braked by the brake apparatus when the cutting apparatus is in the active cutting position. In other words, therefore, the coupling of the cutting apparatus and the brake apparatus may be described as follows. With a movement of the cutting apparatus from the inactive cutting position into the active cutting position, the cutting apparatus actuates, in particular pivots, the brake apparatus from the inactive brake position into the active brake position, so that a rotational movement of the brake roller is able to be braked by the brake apparatus. With a movement of the cutting apparatus from the active cutting position into the inactive cutting position, the cutting apparatus actuates, in particular pivots, the brake apparatus from the active brake position into the inactive brake position so that the brake roller is free-running. The rotational movement of the brake roller may thus be braked by the brake apparatus when the cutting apparatus is in the active cutting position, and the rotational movement of the brake roller is not able to be braked by the brake apparatus when the cutting apparatus is in the inactive cutting position. The cutting apparatus may be movable according to the operating phases of the round baler between the active cutting position and the inactive cutting position. In particular, the operating phases comprise at least the cutting phase in which the cutting apparatus adopts the active cutting position and an introduction phase and a wrapping phase in which the cutting apparatus adopts the inactive cutting position. The cutting apparatus may, in particular, also adopt the inactive cutting position in the bale forming phase. As a result, advantageously the actuation and/or movement of the cutting apparatus may be synchronized with the rotational movement of the brake roller and/or the wrapping material roller, in particular the rotational movement of the brake roller and/or the wrapping roller in the cutting phase, for example, may be braked, in particular, blocked and/or stopped at the same time as the movement of the blade arrangement and the severing of the film.

In an aspect of the disclosure, the brake roller comprises a brake coupling which is connected fixedly in terms of rotation to the brake roller. The brake apparatus further includes a brake lever, in particular an actuatable brake lever, which is connected to the cutting apparatus. The brake lever is actuatable by means of the cutting apparatus such that the brake coupling is able to be braked by means of the brake apparatus, in particular by means of the brake lever. The brake coupling may be configured, for example, as a disc or a drum. The brake coupling may be configured as part of the brake roller or may be connected fixedly in terms of rotation to the brake roller, in particular fastened thereto. The brake lever may comprise a first end and a second end. The cutting apparatus, in particular the blade arrangement and/or an actuator of the cutting apparatus, may be connected to the second end of the brake lever. The brake lever may be pivotably mounted about the pivot point of the brake apparatus on the round baler, for example on the bale wrapping device and/or the frame and/or a side wall of the round baler. The brake lever may thus be moved by means of the cutting apparatus into the active brake position when the cutting apparatus adopts the active cutting position and/or is moved. The brake lever may thus be moved by means of the cutting apparatus into the inactive brake position when the cutting apparatus adopts the inactive cutting position and/or is moved. In particular, therefore, the brake lever may be actuatable by means of the cutting apparatus such that the rotational movement of the brake roller is braked, in particular is stopped and/or blocked, by the brake apparatus, when the cutting apparatus is in the active cutting position, and the brake roller is freely rotatable when the cutting apparatus is in the inactive cutting position.

In an aspect of the disclosure, the brake coupling includes at least one actuating element. A brake element is provided at a first end of the brake lever, the actuating element being able to be gripped thereby. The brake lever in this case is actuatable, in particular pivotable, by means of the cutting apparatus such that the brake element bears against, in particular also grips onto, the actuating element, whereby a rotational movement of the brake coupling may be braked, in particular also stopped and/or blocked. Moreover, therefore, a rotational movement of the brake roller and the wrapping material roller in engagement with the brake roller may be also braked, in particular also stopped and/or blocked. The actuating element may be a stop or a drive element or a lug or the like. The actuating element may also be a groove or a notch on the periphery of the brake coupling. The actuating element may protrude radially from the brake coupling and/or protrude radially into the brake coupling. The brake element may be a stop or a pinion. The brake element may be configured integrally with the brake lever, in particular configured at the first end of the brake lever as a part of the brake lever. Similarly, the brake lever and the brake element may be configured in two pieces, i.e. as two separate components, and the brake element may be connected to the brake lever, in particular releasably fastened thereto preferably at the first end of the brake lever. The brake element may bear against the actuating element in order to brake, in particular to stop and/or to block, the rotational movement of the brake coupling and thus of the brake roller. In particular, the brake coupling may comprise a plurality of actuating elements, in particular two or three. The actuating elements may be distributed equally over the periphery of the brake coupling. In particular, therefore, the brake lever may be actuatable by means of the cutting apparatus such that the brake element bears against the actuating element and the rotational movement of the brake roller is braked, in particular is stopped and/or blocked, when the cutting apparatus is in the active cutting position, and the brake element does not bear against the actuating element when the cutting apparatus is in the inactive cutting position. The aforementioned advantages are achieved by this measure.

In an aspect of the disclosure, the bale wrapping device, in particular the cutting apparatus, comprises an actuator and the brake apparatus is actuatable by means of the actuator. Preferably, the actuator may be connected, in particular operatively connected and/or coupled, to a second end of the brake lever, wherein the brake lever is actuatable by means of the actuator. The actuator may be directly connected to the brake apparatus or indirectly connected via the blade arrangement or a connecting element may be connected, preferably operatively connected and/or coupled, to the brake apparatus, in particular the second end of the brake lever. When actuating the brake apparatus by means of the cutting apparatus, the actuator may exert a force on the brake apparatus, in particular the brake lever, so that this brake apparatus/brake lever pivots and/or is moved in a translatory manner, in particular is pivoted about a pivot point. The actuator may be movable between at least the active cutting position and the inactive cutting position. The brake lever may be actuatable by means of the actuator, in particular according to the operating phases of the round baler, wherein the operating phases include at least an introduction phase, a wrapping phase and a cutting phase. The brake lever may be movable by means of the actuator according to operating phases of the round baler between at least an active brake position and an inactive brake position. In the cutting phase, the actuator may adopt the active cutting position and/or be moved into the active cutting position. Moreover, in the introduction phase and the wrapping phase the actuator may adopt the inactive cutting position and/or may be moved into the inactive cutting position.

At least one, but also two, three, four or more actuators may be provided. The actuator may be configured as a hydraulic cylinder. It is, however, also conceivable to select a different, for example electrical, mechanical or pneumatic, type of actuation, in particular of a cylinder. Thus the actuator may also be configured as an electric motor, for example a spindle motor. A corresponding arrangement with a cable pull is also conceivable in order to design the actuation purely mechanically. The actuator may be provided, for example, in order to move in a translatory manner and/or to pivot the cutting apparatus and/or the blade arrangement. The cutting apparatus and/or the blade arrangement in this case may cooperate in the active cutting position with the wrapping material in order to cut and/or sever off this wrapping material. The brake apparatus may also comprise a restoring element, for example a spring. The restoring element may be connected to the brake lever and/or, for example, may be additionally connected to the frame or a side wall of the round baler or the bale wrapping device. The brake lever may be actuatable by the restoring element such that a spring force acts on the brake lever which has the result either that the brake lever is held in the active or the inactive brake position and/or is moved therein. The brake lever may be moved by means of the actuator into the active brake position when the actuator adopts the active cutting position and/or is moved into the active cutting position. The brake lever may also be moved by means of the actuator into the inactive brake position when the actuator adopts the inactive cutting position and/or is moved into the inactive cutting position. In particular, therefore, the brake lever may be actuatable by means of the actuator such that the rotational movement of the brake roller is braked by the brake apparatus, in particular the brake element bears against the actuating element when the actuator is in the active cutting position and the rotational movement of the brake roller does not interact with the brake apparatus, in particular the brake element does not bear against the actuating element when the actuator is in the inactive cutting position. Such an embodiment is, in particular, simple in terms of structural configuration and/or design and safe in terms of operation. Moreover, due to this measure in the cutting phase, the actuator may be moved into the active cutting position, in particular in order to move the blade arrangement and to sever the wrapping material, and thus advantageously at the same time the rotation of the wrapping material roller may be braked, in particular stopped and/or blocked, in order to avoid problems during the unwrapping of the wrapping material.

In an aspect of the disclosure, the bale wrapping device comprises a drive roller. The drive roller is connected to a drive apparatus, in particular fixedly in terms of rotation. The drive apparatus may be connected to a variably tensionable drive belt and/or to a variably tensionable brake belt. The drive apparatus may be connected to drive means so that the drive roller is able to be driven, in particular is rotatable, by means of the drive apparatus. In particular, the drive belt on the input side may be in engagement with a belt drive roller, wherein said belt drive roller is connected to the drive means. Driven components, in particular directly or indirectly driven pressing rollers of the round baler, may serve as drive means such that, for example, the belt drive roller is connected fixedly in terms of rotation to one of the pressing rollers. It is also conceivable here to select a separate drive, i.e. a drive for the belt drive roller separate from the pressing rollers, for example an electric motor, which is activatable according to different operating phases of a round baler, in particular in the introduction phase and/or the wrapping phase and/or the cutting phase. The bale wrapping device may comprise the further wrapping material roller, wherein the further wrapping material roller is able to be brought into engagement with the drive roller and/or is in engagement in an operating state. The drive roller and the wrapping material roller, however, may be spaced apart from one another. In particular, the drive roller and the wrapping material roller may be spaced apart from one another such that they are not able to be brought into engagement with one another. The wrapping material per se, i.e. the unrolled wrapping material, is able to be brought into engagement with the drive roller, so that the wrapping material roller is drivable indirectly by means of the wrapping material in engagement with the drive roller, by the wrapping material being able to be unrolled by means of the drive roller and being guidable into the pressing chamber. The wrapping material roller may thus be drivable by means of the drive roller, by the wrapping material being unrolled. The further wrapping material roller may be drivable by means of the drive roller, in particular the further wrapping material may also be unrolled by means of the drive roller, so that the further wrapping material is dispensed and is guidable into the pressing chamber. The further wrapping material roller may be drivable by means of the drive roller, by the drive roller directly transmitting its rotational movement to the further wrapping material roller in engagement therewith. The drive apparatus connected to the drive roller may be acted upon by means of the drive belt such that the drive roller, in particular during the introduction phase, is subjected to a drive torque, so that wrapping material is dispensed from the wrapping material roller and/or the further wrapping material is dispensed from the further wrapping material roller and guidable into the pressing chamber. The drive apparatus connected to the drive roller may be acted upon by means of the brake belt such that the drive roller and/or the brake roller, in particular during the wrapping phase and/or the cutting phase, are subjected to a brake torque so that the wrapping material and/or the further wrapping material, which is entrained and/or pulled along by the bale, is tensioned and/or the wrapping material may be cut with optimized wrapping material tensioning. By means of the drive belt, therefore, drive torques which may be set independently of one another may be implemented on the drive apparatus and/or on the drive roller in different operating positions of the bale wrapping device. By means of the brake belt, in particular in combination with the drive belt, therefore, in different operating positions of the bale wrapping device, brake torques which may be set independently of one another, in particular drive and brake torques, may be implemented on the drive apparatus and/or on the drive roller and/or brake roller and/or an optimization of the tightening and/or load relief and/or tensioning of the wrapping material may be permitted, in particular an optimization according to the bale pressing phases.

In an aspect of the disclosure, the drive apparatus includes a combined drive and brake drum, wherein the combined drive and brake drum is connected fixedly in terms of rotation to the drive roller and is connected to the drive belt and to the brake belt. The drive and brake drum may in this case be configured as a single drum or pulley with two parallel belt guides or, for example, also by two pulleys connected together fixedly in terms of rotation. Via the connection of the drive and brake drum to the drive roller, which is fixed in terms of rotation, the drive roller may be driven via the drive belt and also braked at the same time via the brake belt so that a variable rotational speed of the drive and brake drum results via an adjustable engagement action of the drive and brake belt. The drive apparatus may, however, also have only one drive drum, wherein the drive drum is connected fixedly in terms of rotation to the drive roller and is connected to the drive belt. The drive drum in this case may be configured as a drum or pulley with a belt guide. Via the connection of the drive drum to the drive roller, which is fixed in terms of rotation, said drive roller may be driven via the drive belt so that a variable rotational speed of the drive drum results via the adjustable engagement action of the drive belt. The drive apparatus may also comprise an actuatable adjusting device acting on the drive belt. Via the adjusting device a belt tensioning may be provided for the drive belt so that the drive belt is able to be tensioned in a variable manner in different tensioned states. Via the tensioned state of the drive belt, a drive torque acting on the drive and brake drum may be introduced in a variable manner. Moreover, the drive apparatus may comprise an actuatable tensioning device acting on the brake belt. Via the tensioning device a belt tensioning for the brake belt may be provided, so that the brake belt is able to be tensioned in a variable manner into different tensioned states. Via the tensioned state of the brake belt, a brake torque acting on the drive and brake drum may be introduced in a variable manner. The adjusting device acting on the drive belt and the tensioning device acting on the brake belt are preferably connected together, wherein by actuating the adjusting device acting on the drive belt the tensioning device acting on the brake belt is actuatable. The connection of the adjusting device and the tensioning device may be carried out by mechanical, hydraulic or even electrical adjusting means, which are mechanically connected together. It is also conceivable to produce a non-mechanical connection between the adjusting device and the tensioning device via electronic means, so that for example both devices are actuatable respectively via mechanically separate but electronically activatable adjusting means. In terms of a connection, the adjusting device and the tensioning device may thus be connected together by a control unit, so that the tensioning device would be electronically activated according to the adjusting device.

The disclosure further provides a method for operating a round baler. The brake apparatus is actuated by the cutting apparatus such that a rotational movement of the brake roller is braked by the brake apparatus, in particular a rotational movement of the wrapping material roller in engagement with the brake roller is also braked by the brake roller. A round baler having the aforementioned bale wrapping device is preferably operated according to a method which provides that the cutting apparatus is in the inactive cutting position in an introduction phase in which the wrapping material is supplied to the pressing chamber and in a wrapping phase in which the wrapping material is wrapped around the bale in the pressing chamber, and is moved into the active cutting position in a cutting phase in which the wrapping material wrapped around the round bale is cut by the cutting apparatus from the wrapping material roller. The round baler may further comprise a drive axle and a pressing chamber in which a round bale is produced. The method according to the disclosure has the above-described advantages of the bale wrapping device according to the disclosure and the round baler according to the disclosure. Moreover, the bale wrapping device according to the disclosure and the round baler according to the disclosure may be used when carrying out the method according to the disclosure.

The bale wrapping device according to the disclosure or the round baler according to the disclosure may comprise a control unit. The method according to the disclosure may be carried out by the control unit. The round baler, preferably the bale wrapping device and/or the actuator of the cutting apparatus and/or the adjusting device and the tensioning device, may be signal-connected to the control unit. The round baler, preferably also the bale wrapping device and/or the actuator of the cutting apparatus and/or the adjusting device and the tensioning device, may be set and/or adjusted by means of the control unit, i.e. they are controllable and/or regulatable. The control unit (ECU=electronic control unit or ECM=electronic control module) may be an electronic module and/or an embedded system. The control unit may be configured as part of the bale wrapping device or may be provided on the round baler or already provided on a tractive vehicle by which the round baler is pulled. The control unit may also be assigned to the round baler and to the tractive vehicle. The control unit and the bale wrapping device, in particular the actuator of the cutting apparatus and/or the adjusting device and the tensioning device, may be connected together by means of a cable or wire, or even wirelessly, i.e. for example by means of radio.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
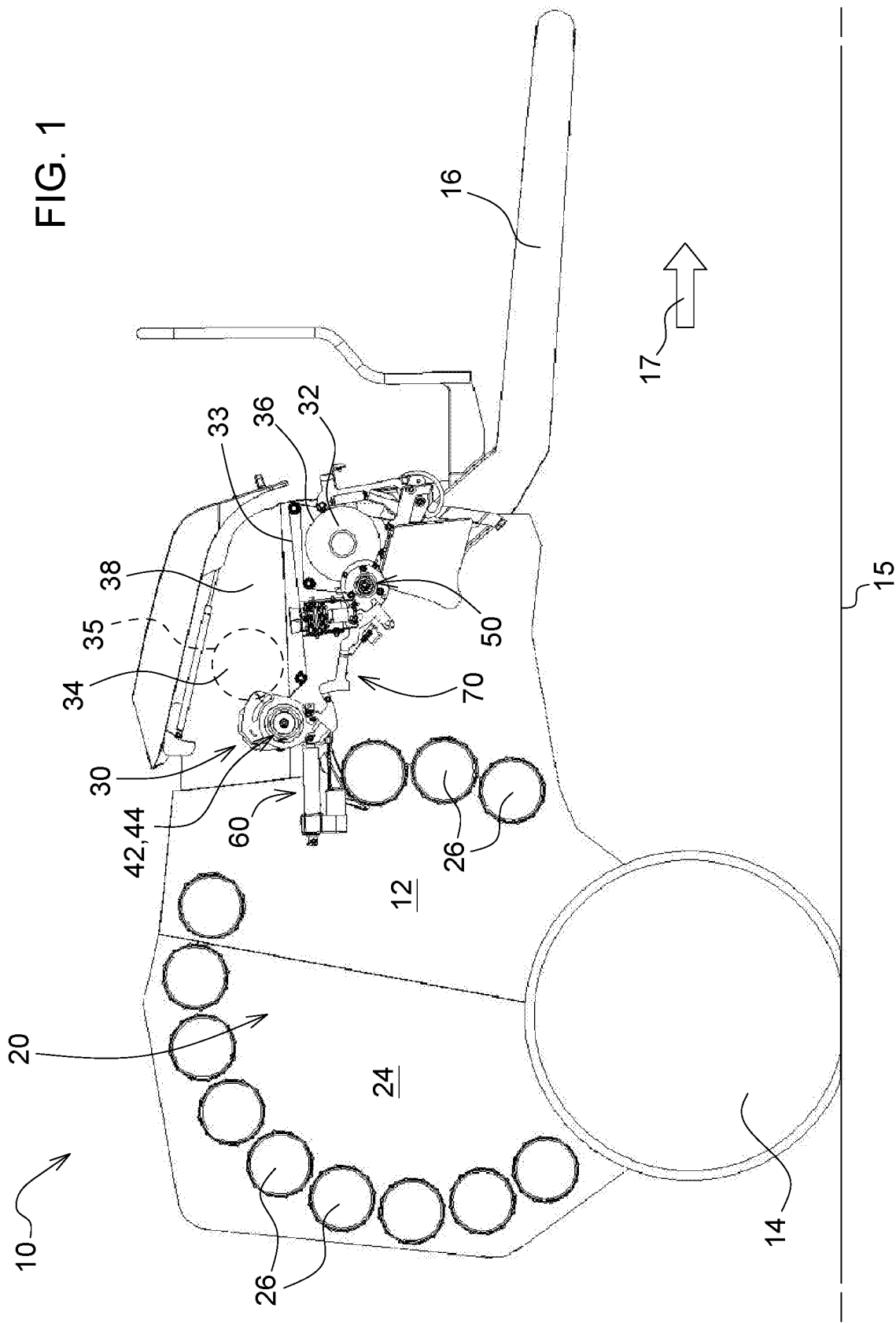
FIG. 1 is a schematic side view of a round baler having a bale wrapping device.

Referring to the Figures, wherein like numerals indicate like parts throughout the several views, a round baler is generally shown at 10 in FIG. 1. The round baler 10 includes a bale wrapping device 30 according to the disclosure. The round baler 10 shown in FIG. 1 includes a first housing part 12 which is supported on the ground 15 by means of wheels 14 and which is able to be attached by means of a tow-bar 16 to a tractive vehicle, not shown, for example an agricultural tractor or tractor. In the known manner, a pick-up and conveying apparatus (not shown) for harvested crops is located on a front lower side of the first housing part 12, in the forward direction 17, wherein the first housing part 12 surrounds a front part of a pressing chamber 20. A bearing (not shown) for a pivotable second housing part 24 which surrounds a rear part of the pressing chamber 20 is located on the first housing part 12, in particular on the upper region of the first housing part 12. The second housing part 24 in the open state (not shown) opens up an outlet (not shown) through which a bale (not shown) pressed by the round baler 10 may be deposited and/or unloaded or ejected. The pivotable second housing part 24 may be actuated (opened and closed) by means of actuating motors (not shown) and thus represents an outlet flap for a bale pressed in the pressing chamber 20.

The round baler 10 which is configured with a fixed-size pressing chamber 20 contains a plurality of pressing elements, running parallel to one another, for pressing harvested crops, in the form of pressing rollers 26 (by way of example here only a few of the pressing rollers 26 have been provided with the reference numeral "26"), the rotational axes thereof, when the second housing part 24 is closed, being positioned on a circular arc and at least some thereof being driven. Alternatively, also in the known manner, the round baler 10 per se may be configured with a variable-size pressing chamber 20 and/or as a round baler 10 with a variable pressing chamber 20, wherein also in the known manner the pressing elements may be configured as belts, straps or chain arrangements (not shown).

Moreover, the round baler 10 includes a bale wrapping device 30 which is provided with a wrapping material roller 32. Preferably a film may be used as wrapping material 33. The bale wrapping device 30 may additionally include a further wrapping material roller 34 with a further wrapping material 35. Preferably a different type of film or a netting may be used as further wrapping material 35. The wrapping material roller 32 may be arranged in a first compartment 36 and the further wrapping material roller 34 may be arranged in a second compartment 38 of the round baler 10, in particular the bale wrapping device 30. The first and second compartments 36, 38 may be spaced apart from one another or adjacent to one another. The bale wrapping device 30 further includes a supply apparatus (not shown) for the wrapping material, by means of which the wrapping material 33 may be guided from the wrapping material roller 32 and/or the further wrapping material 35 may be guided from the further wrapping material roller 34 into the pressing chamber 20. Preferably, the supply apparatus may guide either the wrapping material 33 from the wrapping material roller 32 or the further wrapping material 35 from the further wrapping material roller 34 into the pressing chamber 20.

After the actual pressing process is completed, i.e. the pick-up of harvested crops and the formation of a round bale by the pressing rollers 26, the bale wrapping device 30 is activated and a wrapping process is initiated following the pressing process. When initiating a wrapping process, in an introduction phase, by a mechanically triggered supply movement, wrapping material and/or further wrapping material 33, 35 is guided in the direction of the pressing chamber 20 so that a free wrapping material end may come into contact with the round bale rotating in the pressing chamber 20 and the wrapping material and/or further wrapping material 33, 35 is entrained and received. By rotating the round bale, the wrapping material 33 and/or the further wrapping material 35 is wrapped in one or more layers around the periphery of the round bale in a wrapping phase. The wrapping process is completed with a cutting phase in which the wrapping material 33 which is wrapped around the round bale is cut from the wrapping material roller 32 and/or the further wrapping material 35 is cut from the further wrapping material roller 34 by a cutting apparatus 60.

Figure 2:
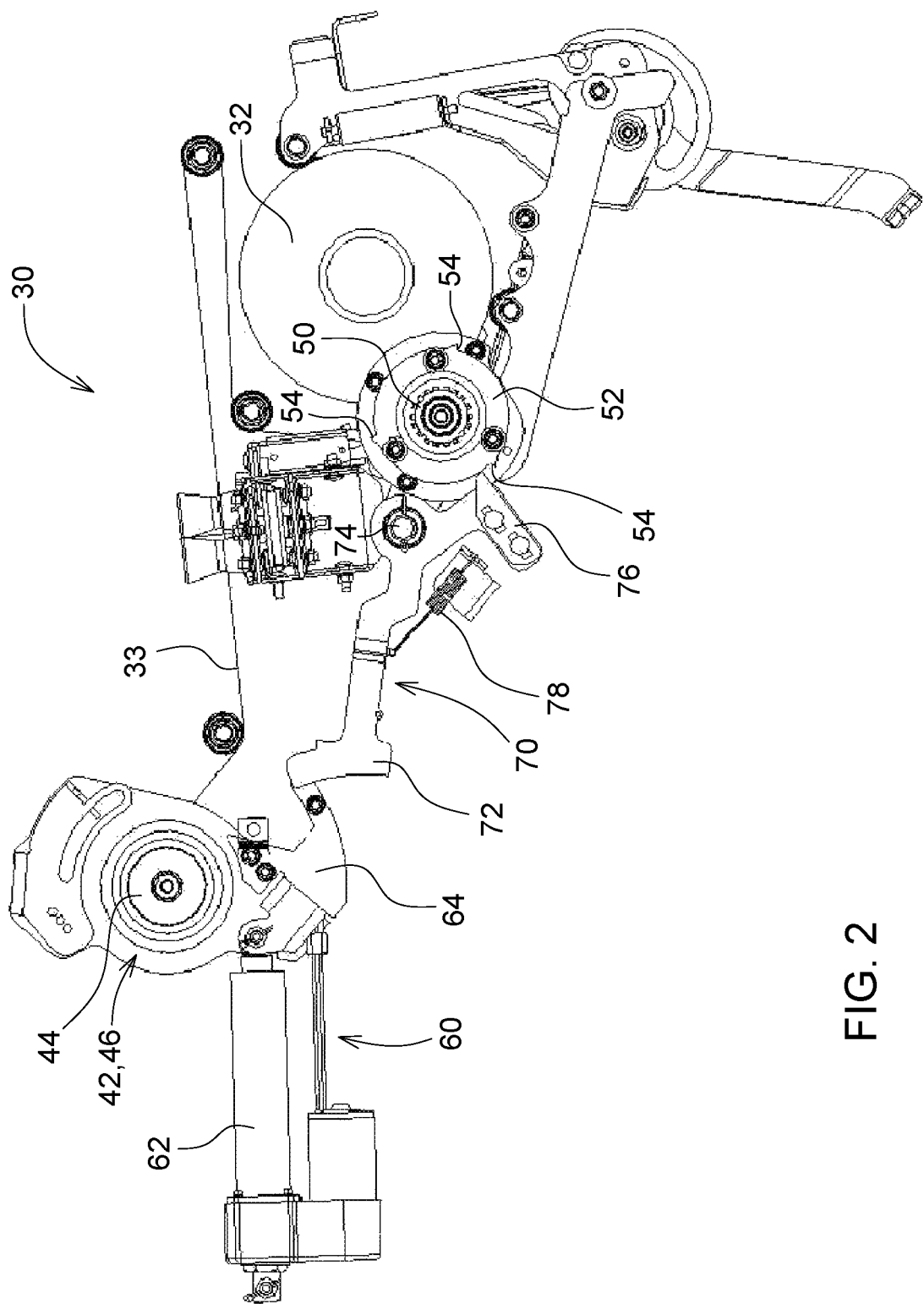
FIG. 2 is a schematic fragmentary side view of the bale wrapping device of FIG. 1 showing a cutting apparatus in an active cutting position.
Figure 3:
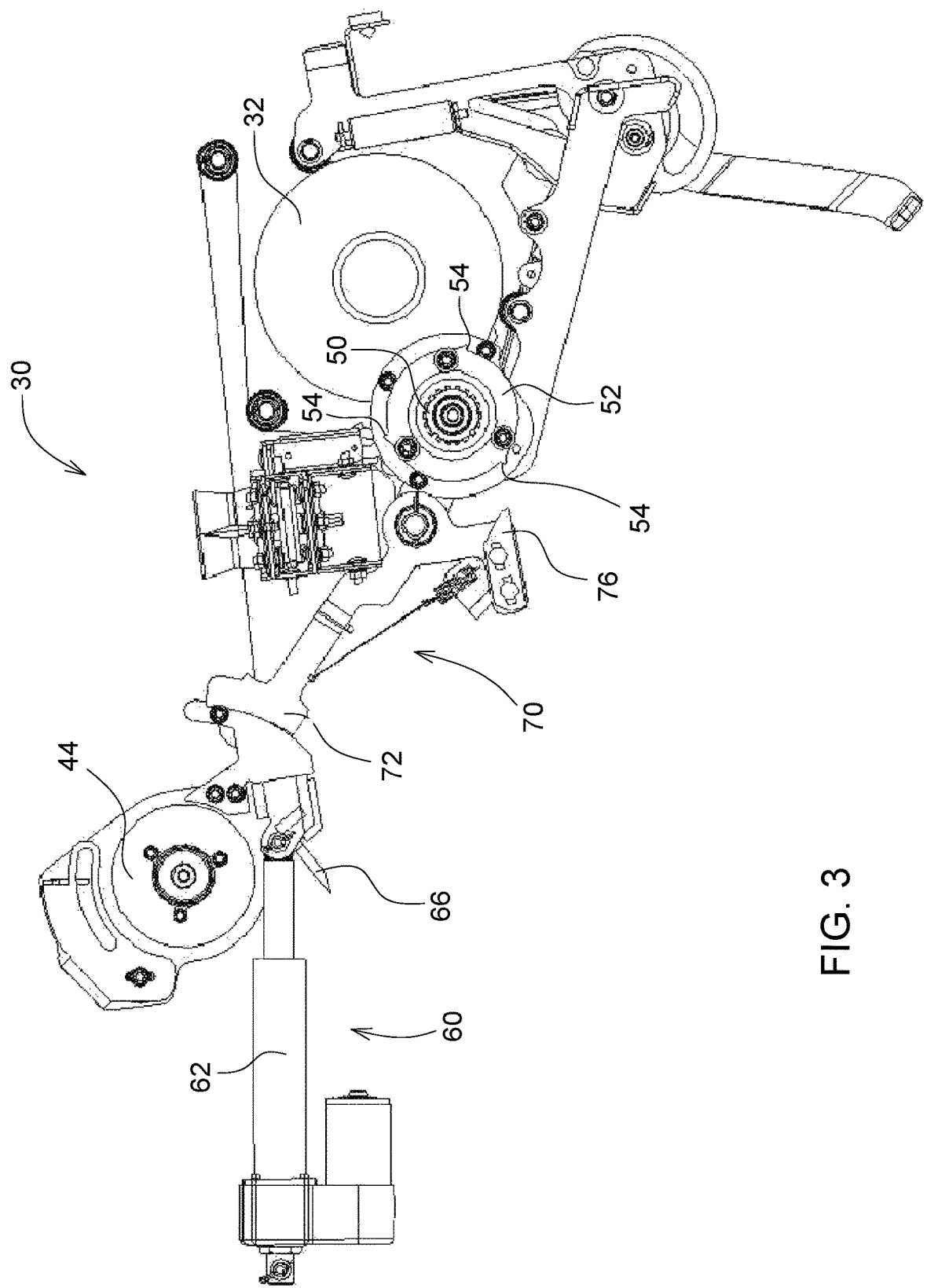
FIG. 3 is a schematic fragmentary side view of the bale wrapping device of FIG. 1 showing the cutting apparatus in an inactive cutting position.

The schematic side views of the bale wrapping device 30 shown in FIGS. 2 and 3 correspond to the bale wrapping device 30 shown in FIG. 1, so that hereinafter only the details and/or differences thereof are described. The bale wrapping device 30 includes a drive apparatus 42 which is connected to a drive roller 44. The drive roller 44 may be in engagement with the further wrapping material roller 34 and/or may be in a frictional connection therewith. The drive apparatus 42 further comprises a combined drive and brake drum 46 which is connected both to a variably tensionable drive belt (not shown) and to a variably tensionable brake belt (not shown). The drive and brake drum 46 is connected fixedly in terms of rotation to the drive roller 44 and is also connected to the drive belt and to the brake belt.

The wrapping material roller 32 may be in engagement with the brake roller 50 and/or in a frictional connection therewith. Moreover, a brake apparatus 70 which cooperates with the brake roller 50 is provided, wherein the brake apparatus 70 is able to be actuated by means of the cutting apparatus 60, such that a rotational movement of the brake roller 50 is able to be braked, in particular stopped and/or blocked, by the brake apparatus 70. The cutting apparatus 60 comprises an actuator 62 which is movable between at least one active cutting position (FIG. 2) and an inactive cutting position (FIG. 3) and a blade arrangement 66 (see FIG. 3). The brake apparatus 70 in this case is actuatable by means of the cutting apparatus 60, in particular pivotable about a pivot point 74, such that a rotational movement of the brake roller 50 is able to be braked by the brake apparatus 70, in particular when the cutting apparatus 60 is in the active cutting position and/or is moved into the active cutting position. So that it is actuatable by means of the cutting apparatus 60, the brake apparatus 70 may thus be mounted pivotably on a pivot point 74 on the round baler 10 and/or the bale wrapping device 30. In particular, the brake apparatus 70 comprises an actuatable brake lever 72 which is pivotably mounted about the pivot point 74 on the round baler 10 and/or the bale wrapping device 30. The brake lever 72 comprises at a first end a brake element 76 which is configured as a stop and is releasably fastened to the brake lever 72. At a second end the brake lever 72 is connected to the cutting apparatus 60. In particular, the actuator 62 may also be connected via a connecting element 64 to the brake lever 72. The brake apparatus may also comprise a restoring element 78. A second end of the brake lever is connected to the actuator.

The brake roller 50 includes a brake coupling 52 which is configured as a disc and which is connected fixedly in terms of rotation to the brake roller 50. The brake coupling 52 also comprises three actuating elements 54 which are configured as drive elements.

The actuating elements 54 are able to be gripped by the brake element 76. In this case, the brake lever 72 is able to be actuated by means of the cutting apparatus 60, in particular the actuator 62, such that the brake element 76 bears against the actuating element 54.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A bale wrapping device for a round baler, the bale wrapping device comprising:
   a brake roller;
   a wrapping material roller for supporting a wrapping material, wherein the wrapping material roller is selectively engageable with the brake roller;
   a cutting apparatus configured for cutting off the wrapping material from the wrapping material roller;
   a brake apparatus coupled to the brake roller and the cutting apparatus, wherein movement of the cutting apparatus actuates the brake apparatus such that rotational movement of the brake roller is braked by the brake apparatus in response to movement of the cutting apparatus.

2. The bale wrapping device set forth in claim 1, wherein the cutting apparatus is movable between at least an active cutting position and an inactive cutting position, with the brake apparatus operable to brake rotational movement of the brake roller when the cutting apparatus is disposed in the active cutting position.

3. The bale wrapping device set forth in claim 2, wherein the bale wrapping device includes an actuator operable to actuate the brake apparatus.

4. The bale wrapping device set forth in claim 3, wherein the actuator is operable to move the cutting apparatus between the active cutting position and the inactive cutting position.

5. The bale wrapping device set forth in claim 1, wherein the bale wrapping device includes a drive roller operable to feed the wrapping material into a baling chamber.

6. The bale wrapping device set forth in claim 5, wherein the drive roller is connected to a drive apparatus.

7. The bale wrapping device set forth in claim 1, wherein the brake apparatus includes a brake coupling fixedly connected in terms of rotation to the brake roller, and a brake lever coupled to the cutting apparatus, wherein the brake lever is actuatable in response to movement of the cutting apparatus to engage the brake coupling to brake the brake roller.

8. The bale wrapping device set forth in claim 1, wherein the brake coupling includes at least one actuating element and the brake lever includes a first end having a brake element, wherein the actuating element is configured for gripping engagement with the brake element such that the brake element bears against the actuating element in response to movement of the brake lever.

9. The bale wrapping device set forth in claim 1, the drive apparatus includes a combined drive and brake drum fixedly connected in terms of rotation to the drive roller.

* * * * *